United States Patent [19]
Innis

[11] 3,866,943
[45] Feb. 18, 1975

[54] SPLASH GUARD

[76] Inventor: Pamela B. Innis, 2733 St. Laurent Pl., La Jolla, Calif. 92037

[22] Filed: Apr. 23, 1973

[21] Appl. No.: 353,565

[52] U.S. Cl. ......................................... 280/154.5 R
[51] Int. Cl. ........................................... B62d 25/16
[58] Field of Search ...... 280/154.5 R, 153 R, 152 R

[56] References Cited
UNITED STATES PATENTS
2,239,373   4/1941   Schatzman ...................... 280/153 R
3,675,943   7/1972   Moore .......................... 280/154.5 R

*Primary Examiner*—Robert R. Song
*Attorney, Agent, or Firm*—Ralph S. Branscomb

[57] ABSTRACT

A splash guard secured to a truck body or frame and disposed laterally outwardly of a wheel of the truck and so mounted as to be easily liftable or removable to provide access to the wheel for maintainance.

1 Claim, 8 Drawing Figures

PATENTED FEB 18 1975   3,866,943

SPLASH GUARD

BACKGROUND OF THE INVENTION

It is common practice and generally required by law to fit trucks with mudflaps disposed behind the wheel to prevent the projection of mud, water, sand or the like into the path of following vehicles. However, in wet weather conditions these flaps do not prevent the sidewise escapement of great billows of dense sidespray or swash created by the tires from beneath the truck during relatively high-speed driving. In addition, debris in occasionally thrown laterally rather than rearwardly of the truck. As a consequence, a motorist attempting to pass a truck under these conditions takes his life into his hands, especially on a two-lane highway, while he attempts to plow his way through the almost zero visibility-producing swash created in the passing lane adjacent to the truck.

Attempts have been made to remedy the problem, but the devices used do not adequately control the area adjacent to the truck, and are not adaptable to effective use on tandem-axled vehicles. Additionally there is no provision for easily moving the prior art shields out of the way to provide access to the wheel, so that a driver having a flat tire is faced with the time-consuming initial problem of dismantling the shields prior to changing the tire.

SUMMARY OF THE INVENTION

The present invention is a splash guard mounted on a frame attached to a truck, laterally adjacent to the wheels to inhibit side spray created by the wheels. The splash guard comprises a panel which can be pivoted and/or slideable retracted on its mounting away from the wheels to provide access during maintenance such as inspection and replacement of tires. The panel can be constructed as long as is necessary to effectively inhibit side spray without interfering with the normal operation of the truck.

DETAILED DESCRIPTION OF THE PREFERRED EMBODIMENT

Figure 1:
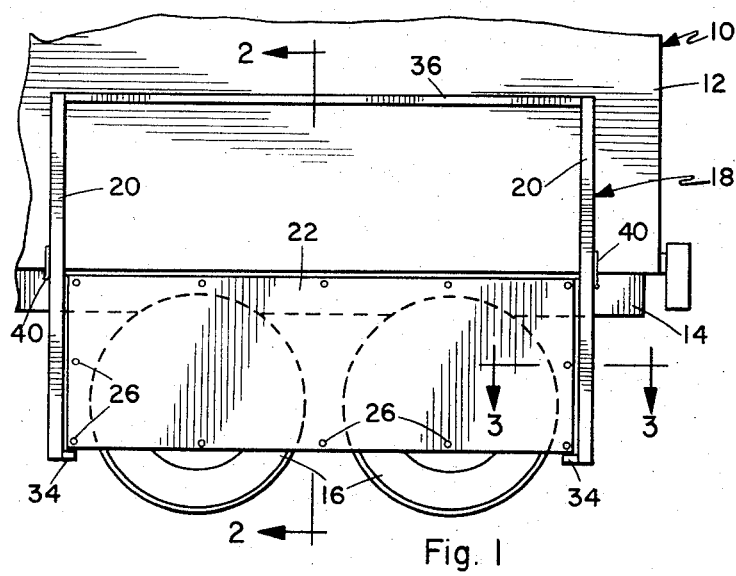
FIG. 1 is a side elevation view of the rear wheel unit of a trailer with the skirt structure attached.

A truck or truck trailer 10 has a body 12 supported by understructure 14 and wheels 16.

As disclosed in FIGS. 1–4, on the side of the truck above the wheels is mounted a fixed frame 18 which comprises two channel posts 20, ordinarily fixed to the truck body 12. A panel 22 is preferably removably mounted on panel frame 24 by means of spaced snap buttons 26 on the panel frame which engage mating eyelets 30 on the panel. The two side members 32 of the panel frame 24 slideably engage the channel posts 20 so that the panel and panel frame are carried by the fixed frame 18 and can be vertically displaced from a lower to an upper position as described below.

The lowermost ends of channel posts 20 have stops 34 mounted thereon which define the lower position of the panel and panel frame and support the frame in that position. The uppermost position of the panel and panel frame may be similarily defined by a horizontal bar 36 extending between the tops of the channel posts.

In order to provide additional support for the lower portions of posts 20, braces 38 may be mounted on and between the posts and the understructure 14 of the truck.

Figure 2:
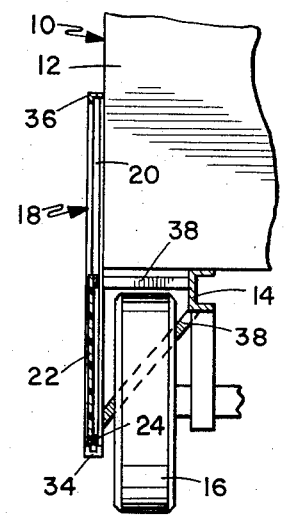
FIG. 2 is a sectional view taken on line 2—2 of FIG. 1.
Figure 3:
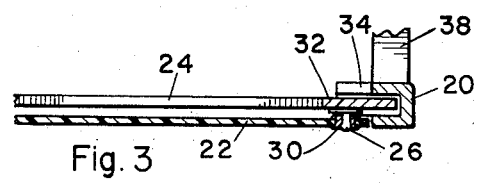
FIG. 3 is an enlarged sectional view, taken on line 3—3 of FIG. 1.
Figure 5:
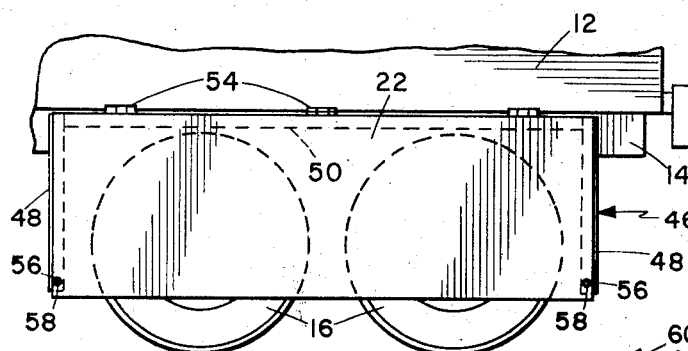
FIG. 5 is a side elevation view of an alternative hinged skirt structure.

During normal use of the truck, the skirt panel 22 will be in the lowered position as best illustrated in FIGS. 1 and 2, the bottom of the panel frame being supported by the stops 24 slightly above the level of the bottom of the wheels. The panel should be wide enough to extend both forwardly and rearwardly of the wheels sufficiently to inhibit the escape of swash from beneath the truck.

Figure 4:
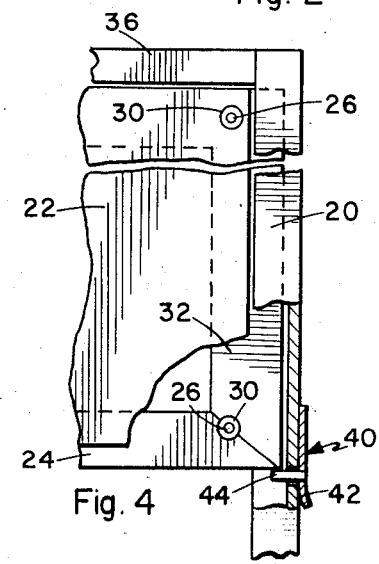
FIG. 4 is an enlargement of the upper right hand portion of FIG. 1 with portions cut away to show the skirt in raised position.
Figure 6:
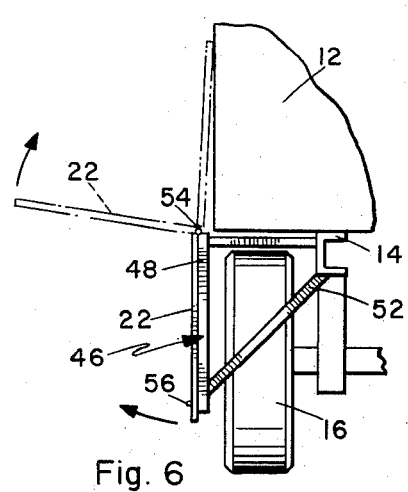
FIG. 6 is a rear elevation view of the structure of FIG. 5.

In case one of the tires becomes flat or one of the wheels requires maintainence, the panel and panel frame can be slid upwardly between the channel posts into an upper position best illustrated in FIG. 4, to provide access to the wheels. Catches 40 are mounted on the channel posts above the wheel and snap into engagement with the bottom edge of the panel when the panel is lifed past the catches so that the panel is retained in its uppermost position while the wheel is undergoing maintainence. Although any appropriate catch mechanism could be used the illustrated catches 40 are each constructed of a resilient strip 42 dispose parallel to the outer side of one of the posts 20, the upper end of the strip being brazed to the post and the lower end having a peg 44 which protrudes through a hole in the channel post to engage the underside of panel 22. To allow passage of the panel vertically in the channel posts, the catches are manually pressed outwardly to withdraw the pegs 44 and clear the channels.

Although a single splash guard is described herein, it is to be understood that a truck would normally employ at least two such guards, one on each side of the truck covering the wheels on the major axle, and likely more guards would be provided for other wheels. The splash guard panels are preferably brightly colored to increase the visibility of the truck during foul weather and at night, and thus provide an excellent medium for displaying advertising messages. Different panels can be imprinted with various advertisments. Fluorescent paint may be used or the panels could be lighted, and since a panel is removably snapped onto the panel frame 24, it can be unsnapped and replaced with a panel bearing a different message.

FIGS. 5 through 8 illustrates a modified mounting means for the skirt panel 22 in which the frame of the panel consists of a rigid bracket 41 comprised of two vertical side bars 28 and a horizontal top bar 50 mounted on the tops of side bars 48. The side bars are mounted on the understructure 14 of the truck by means of braces 52.

Top bar 50 has mounted thereon hinges 54 by means of which the panel 22 is pivotally attached to the frame. The lower portions of side bars 48 have a means of releasably engaging the lower portion of the panel 22 such as snap buttons 56 which engage eyelets 58 of the panel. Then the panel is secure in its lower position, and yet can be pivoted upward to expose the wheel for maintainence.

Figure 7:
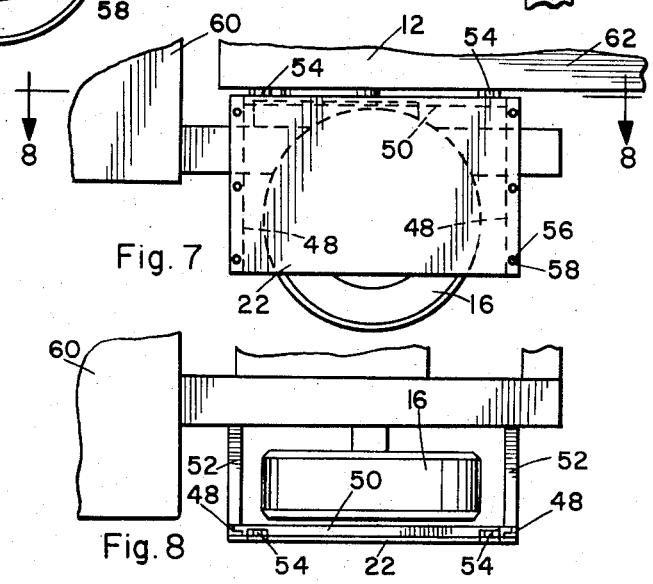
FIG. 7 is a side elevation view of a skirt mounted on the tractor unit of a truck and trailer combination.
Figure 8:
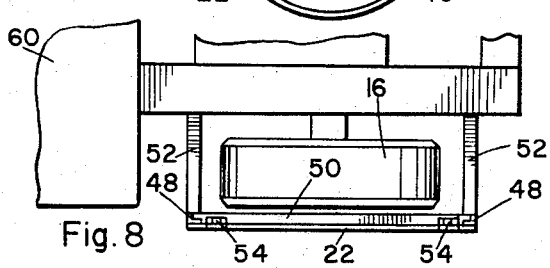
FIG. 8 is a view taken in the direction of arrows 8—8 in FIG. 7.

The hinged embodiment of the splash guard is particularly adaptable for use on the rear wheels of a tractor 60 which is used in combination with a trailer 62 as illustrated in FIGS. 7 and 8. As the vehicle turns, the rear tractor wheels, which are disposed beneath the forward portion of the trailer, swing out from beneath the body of the truck, and would bind against a splash guard of the slideable variety illustrated in FIGS. 1 through 4. In the hinged embodiment, however, the truck body clears the hinge and panel as the truck turns.

The width of the splash guard need not be restricted to the general size described above. It might be desireable on a truck having two axles of two sets of axles to employ two guards on each side of the truck which form a generally continuous skirt for the entire length of each side of the truck. A single splash guard might also be used on each side of the truck, extending a substantial length of the truck body. In addition, a splash guard of the type described could be mounted on the rear of a vehicle to supplement or replace the mudflaps currently in use.

I claim:

1. A splash guard for a truck having at least one ground-contacting wheel and a body portion overhanging said wheel and a side of said body portion disposed above and outwardly of said wheel, said splash guard comprising:

two vertically spaced tracks mounted to and extending above and below the lowermost portion of said side;

a panel slideably received in said tracks and disposed outwardly of said wheel and substantially normal to the axis thereof and coextensive with a major portion of said wheel, whereby sidespray or swash created by the turning wheel on wet pavement is deterred from sidewise escapement;

said panel being capable of upward displacement in said tracks to permit access to said wheel for maintainence; and a locking means whereby said panel can be established at any of a plurality of vertically spaced levels.

* * * * *